Dec. 8 1925.          1,565,024
R. D. MERSHON
PREVENTING CORROSION OF ELECTROLYTIC CONDENSER LEADS
Filed Dec. 23, 1920    3 Sheets-Sheet 1
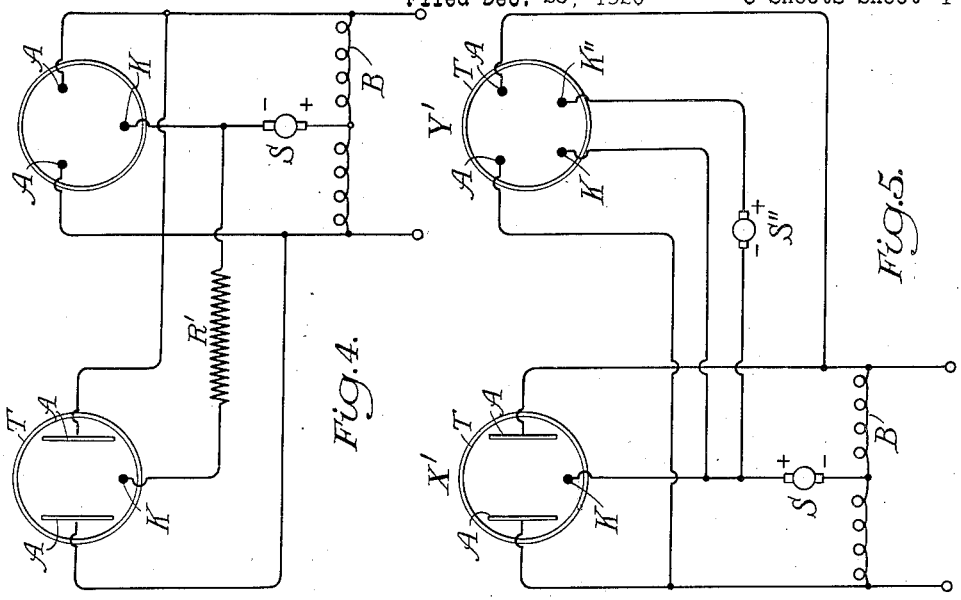
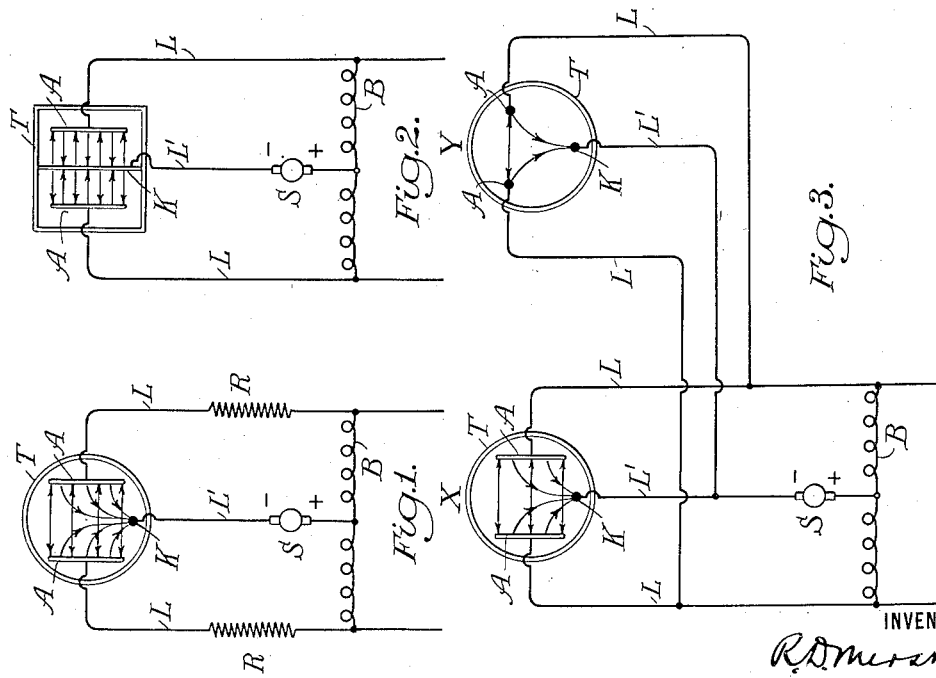
INVENTOR
R. D. Mershon
BY
Kerr, Page, Cooper & Hayward
ATTORNEYS Dec. 8, 1925.　　　　　　　　　　　　　　　1,565,024
R. D. MERSHON
PREVENTING CORROSION OF ELECTROLYTIC CONDENSER LEADS
Filed Dec. 23, 1920　　　3 Sheets-Sheet 2
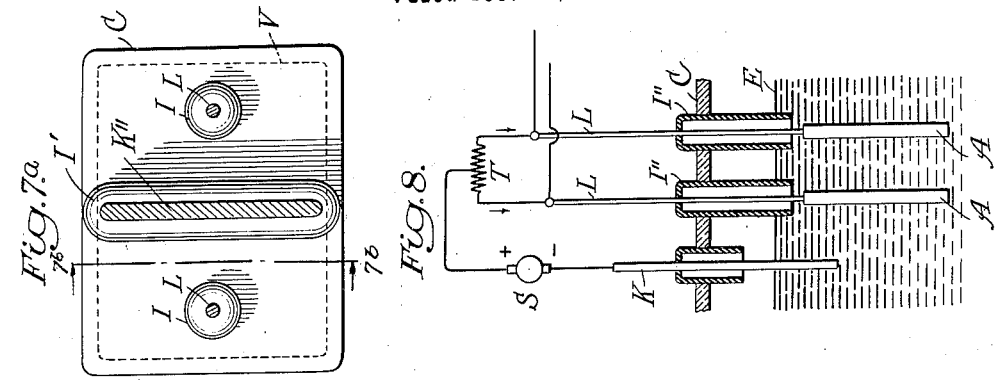
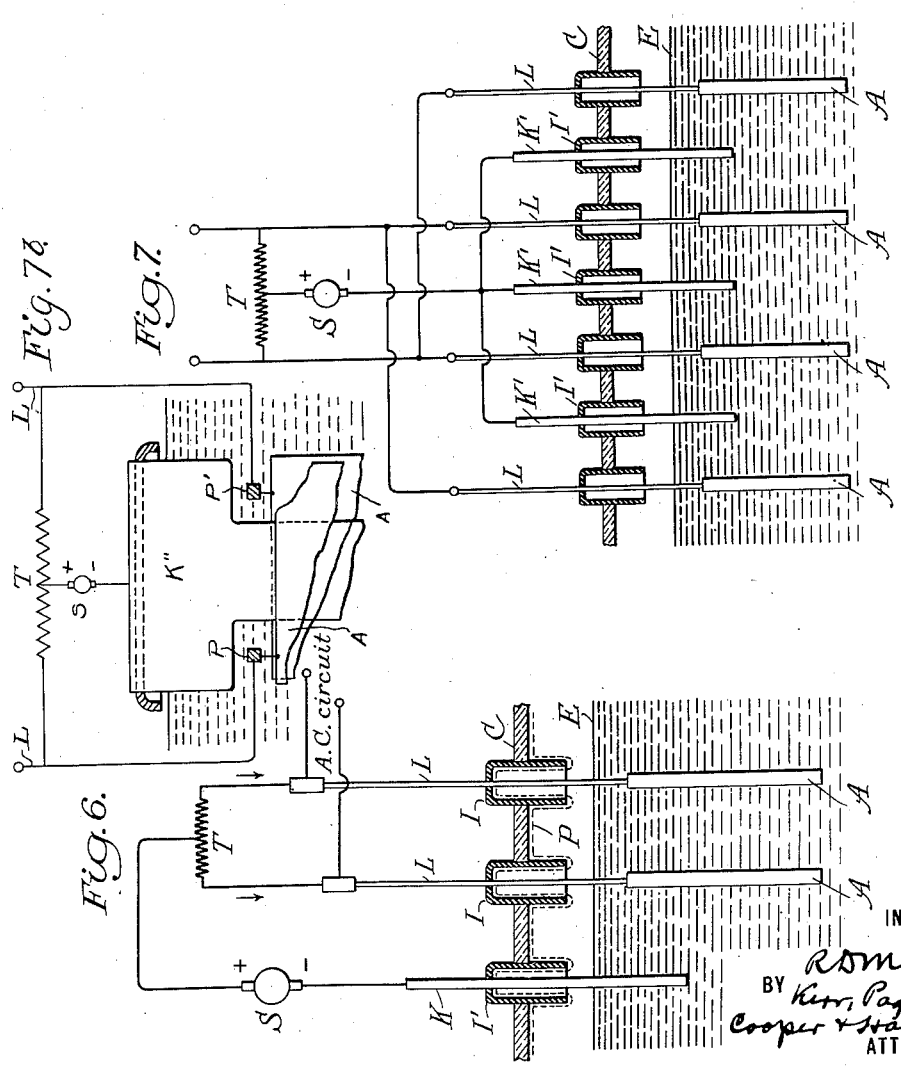
INVENTOR
R. D. Mershon
BY Kerr, Page,
Cooper & Hayward
ATTORNEYS Dec. 8, 1925.  R. D. MERSHON  1,565,024
PREVENTING CORROSION OF ELECTROLYTIC CONDENSER LEADS
Filed Dec. 23, 1920   3 Sheets-Sheet 3
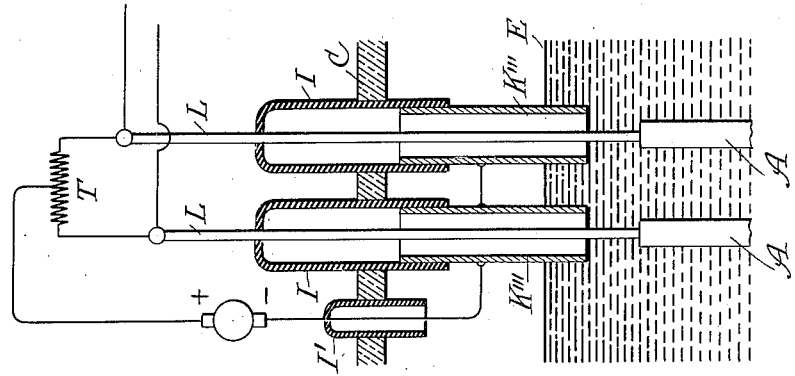
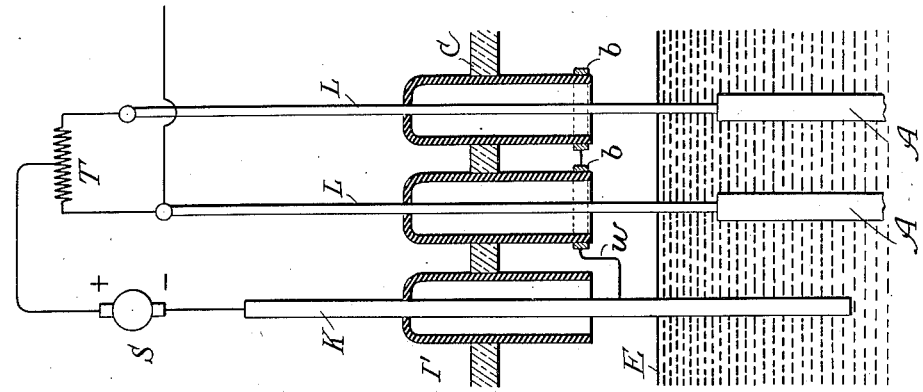
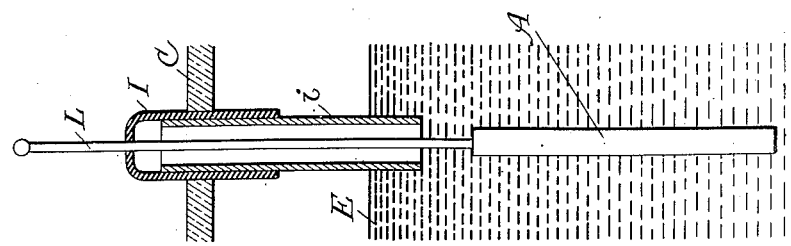
INVENTOR
R. D. Mershon
BY
Kerr, Page, Cooper & Hayward
ATTORNEYS Patented Dec. 8, 1925.

1,565,024

UNITED STATES PATENT OFFICE.

RALPH D. MERSHON, OF NEW YORK, N. Y.

PREVENTING CORROSION OF ELECTROLYTIC CONDENSER LEADS.

Application filed December 23, 1920. Serial No. 432,886.

*To all whom it may concern:*

Be it known that I, RALPH D. MERSHON, a citizen of the United States of America, residing at New York, in the county and State of New York, have invented certain new and useful Improvements in Preventing Corrosion of Electrolytic Condenser Leads, of which the following is a full, clear, and exact description.
In the operation of electrolytic condensers the leads extending out from the electrolyte to connect the active electrodes to the external circuit are often subject to corrosion, which, if unchecked, eventually destroys the metal and so puts the condenser out of operation. This corrosion occurs even in condensers of the excited type, in which a source of unidirectional current is employed to prevent reversal of film stress. The excitation is effective to prevent corrosion of the electrodes and those portions of the leads immersed in the electrolyte, but is not always effective to prevent corrosion of the leads at points outside the electrolyte. As the result of extended experience with electrolytic apparatus in general and condensers in particular I have been led to believe that the corrosion is due in most if not all cases to the more or less conducting film of moisture, electrolyte, salt, or other material deposited from the electrolyte, upon, and between, the insulators through which the alternating current leads extend for connection to the external circuit; and to the action of this film (which I shall designate as the "moisture film" to distinguish it from the dielectric film on the electrodes and leads) as a sort of secondary electrolyte, in which reversal of film stress occurs. The present invention is accordingly directed to obviating this trouble and its chief object is to provide a simple and effective method of preventing such reversal of film stress.

In the accompanying drawings, Fig. 1 represents a simple condenser of the excited type, having active electrodes (or "anodes" as they may be conveniently termed) of large area relative to the electrode (or "cathode") by which the negative pole of the exciting source is connected to the electrolyte. Fig. 2 illustrates an embodiment in which the cathode is a wide cathode, between the anodes. Fig. 3 is a diagram in which the anode and cathode leads, and the moisture film on the underside of the cover, are considered as forming a separate condenser, represented at Y, distinct from the main electrodes and electrolyte forming the condenser X. In these three figures the flow of current (both alternating and unidirectional) in the electrolyte is indicated in a rough way by the double-headed and single-headed arrows respectively.

Fig. 4 illustrates an embodiment of the invention, in which the condenser formed by the leads and the moisture film is excited by a higher voltage than that impressed on the "main" condenser composed of the anodes, cathode and main electrolyte.

Fig. 5 illustrates an embodiment which is similar to that of Fig. 4 but in which an additional exciting source is provided for the purpose of exciting the moisture-film condenser at a higher voltage.

Fig. 6 is a sectional side view representing, less diagrammatically than Fig. 1, a simple condenser of the excited type. This figure shows the tank-cover and insulators, and indicates the moisture film by means of a dotted line.

Fig. 7ª is a plan view, and Figs. 7, 8, 9, 10 and 11 are sectional side views, illustrating various methods of preventing corrosion of the anode leads.

Fig. 7ᵇ is a cross section, on a plane indicated by lines 7ᵇ—7ᵇ of Fig. 7ª, showing a wide cathode which is narrowed below the surface of the electrolyte to accommodate longitudinal busbars immersed in the electrolyte and extending over the tops of the anodes.

Referring to Fig. 1: A, A, represent a pair of anodes immersed in an electrolyte contained in a tank T, and connected to the alternating current circuit by means of the leads L, L. Across leads L, L, is a balance coil or autotransformer B, to the neutral point of which is connected the positive pole of a source S of unidirectional current (pulsating or uniform) to keep the electrolyte negatively charged with respect to the anodes. The negative pole of the exciting source S is connected to a "cathode" K, composed of nickel, carbon, or other non-filming material, which is also immersed in the electrolyte. For a detailed explanation of the theory and operation of the excited electrolytic condenser reference may be had to my prior Patent No. 1,077,628. It may be stated, however, that if the negative charge in the electrolyte is not maintained by a unidirectional source of current it will be maintained by alternating current from the circuit with which the condenser is connected, but that in such case the dielectric films, with which the anodes and leads are coated and upon which the operation of the condenser depends, are subject to injury and the underlying metal to corrosion, with resulting impairment of efficiency of operation and ultimate destruction of the filmed portions. It has been found, however, that separate or external excitation of the condenser does not always suffice to prevent corrosion of the leads at points outside the electrolyte, and especially where they come in contact with other bodies, such as the insulators through which they are brought through the cover of the tank. As will be clear from the patent above referred to and from other patents and applications of mine bearing upon the same subject, particularly application Serial No. 393,914, the negative charge maintained in the electrolyte by the unidirectional exciting voltage must, in order to be fully effective in safeguarding the dielectric films on the anodes and leads, be of such value as will prevent reversal of film stress on the films. That is, the voltage of the charge with respect to the anodes and leads must never be less than one half the instantaneous value of the alternating voltage effective between the anodes; which means, in general, that in the operation of the condenser the voltage of the charge should be maintained at not less than half of the maximum instantaneous value. Suppose Fig. 1 represents a condenser in which the resistance of the electrolyte is so low that it may be ignored, and in which the relation between the exciting voltage and the alternating voltage is just such as will prevent reversal of film stress. Inasmuch as there will always be some leakage through the dielectric films tending to neutralize the negative charge in the electrolyte, there will always be more or less current supplied by the unidirectional source S, through the lead L' to offset this tendency and maintain the negative charge at its proper value. Now suppose a resistance (not shown) be introduced into the lead L', causing a CR drop due to the exciting current and thus diminishing the unidirectional voltage effective for maintaining the negative charge. The result is a diminution of the voltage of the charge and a departure from the relation necessary to prevent reversal of film stress. There will then be a periodic reversal of film stress tending to impair the dielectric films on the anodes and leads. The amount and rapidity of this impairment will depend upon the amount of the reversed film stress. If the value of the exciting voltage from the source S be increased sufficiently to compensate for the CR drop, thus restoring to its former value the exciting voltage effective for maintaining the negative charge, then the reversal of film stress will cease. This illustrates one of the reasons why the total exciting voltage supplied by the unidirectional source is usually made greater than that theoretically necessary to maintain the negative charge at a value to prevent reversal of film stress; that is, in order to compensate for CR drop in the source of unidirectional current itself, and in the leads therefrom; and for such drop as there may be in the electrolyte (which necessarily has some resistance), effective in the exciting circuit only, due to the disposition of the cathode, its small size, etc. But suppose that, things being as at first assumed, instead of introducing a resistance into the lead L' we introduce a resistance, as R, R, into either or both the leads L. (If resistance be introduced into both leads the two resistances may be equal or unequal.) Such a proceeding will not produce reversal of film stress. For, although the exciting current will have to flow through these resistances, thus producing CR drop in the exciting circuit, the alternating current will also have to flow through them producing a CR drop in the A. C. circuit proportionately as great as, or greater than, that in the exciting circuit. Hence the voltage of the negative charge will not fall below that necessary to prevent reversal of film stress. If resistance be introduced into one or both of the A. C. leads L, L, and also into the exciting lead L', then it is clear from what has been said, that there will be reversal of film stress, but that if the total exciting voltage be raised to a point to overcome the CR drop due to the resistance in the exciting circuit, the reversal of film stress will cease.

It should be noted that when, as assumed above, resistance is introduced into one or both of the A. C. leads, the whole of the alternating current flows through the resistance or resistances. On the other hand, the exciting current divides, part flowing through the single resistance and part through the other A. C. lead, or part through each resistance when two are employed. We should not, strictly speaking, say that the exciting current and the alternating current have "identical" paths or even "common" paths, since all of the alternating current flows through the whole path and only part of the exciting current through each part of the path. For a similar reason, it is not strictly true to say that the resistance of the alternating current path and the resistance of the direct current path are the same, or equal. Nevertheless, for want of a better brief expression, these and similar terms will, to avoid circumlocution, be employed in what follows in dealing with conditions similar, or similar in effect, to that in which resistance is introduced into one or both of the alternating current leads. Such expressions will be employed both in the descriptive matter and in the claims, in reading which, the significance of the expressions should be borne in mind.

It may be stated, therefore, that wherever the alternating current and the exciting current have "common paths" or "identical paths", there will be no reversal of film stress no matter what the resistance of the "common path" may be, provided the relation between the value of the exciting voltage and the value of the alternating voltage is that which would prevent reversal of film stress if the resistance of the common path were zero. And it may also be stated that if, in a part of the path of the exciting current not "identical", there be a voltage drop, which if uncompensated for would result in reversal of film stress, reversal of film stress will be prevented if the exciting voltage be raised to a value to compensate for this voltage drop.

Now what will hold for resistances outside the electrolyte will hold for resistances inside the electrolyte. That is, for the resistance of the electrolyte itself. For instance, suppose, as before, Fig. 1 represents a condenser the resistance of whose electrolyte is entirely negligible and the relation between whose two voltages is such as to just prevent reversal of film stress. Then if the low resistance electrolyte be replaced by a high resistance one, there will be reversal of film stress. For, in the case of Fig. 1, the alternating current and the exciting current have not "identical" or "equal" resistance paths, both because the area of each of the anodes is greater than that of the cathode and because the cathode is not between the anodes, but off at one side. This is clearly shown by the arrows in Fig. 1, the double headed arrows indicating the flow of alternating current between the anodes and the single headed arrows indicating the flow of exciting current from the anodes to the cathode. If, however, we were to employ the arrangement shown in Fig. 2, in which the tank is assumed to be of glass or other suitable insulating material and in which the cathode forms a partition between the anodes such that no current can flow around its edges, then, no matter how high the resistance of the electrolyte, there can be no reversal of film stress if the relation between the alternating voltage and the unidirectional exciting voltage be such as to prevent reversal of film stress in an electrolyte of negligible resistance. This will be true whether the cathode be placed, as shown in Fig. 2, midway between the anodes or nearer one than the other. In Fig. 2 the paths of the alternating and exciting currents are "common" or "identical" and the paths of the alternating and exciting currents in the electrolyte have the "same" resistance. If in Fig. 2 the cathode be not brought out to the sides and bottom of the tank but a space left through which alternating current may flow around the edges of the cathode, then the alternating and exciting current paths will not be "identical" and, under the conditions previously assumed, reversal of film stress can take place. But as explained above such reversal can be prevented by raising the value of the exciting voltage. Similarly, the tendency to reversal due to a high resistance electrolyte in Fig. 1 can be overcome by sufficiently raising the value of the exciting voltage.

Suppose we have two condensers, X and Y, as in Fig. 3, connected in multiple both as to their A. C. leads and their exciting leads. Suppose one of them, X, is of the usual type, that is, its anodes A, A, having relatively large area and its cathode K a relatively small area. Suppose the anodes A, A, and the cathode K of Y to be in the form of rods. Suppose the resistance of the electrolyte of X to be relatively low, and that of Y to be very high. Suppose also that the exciting voltage be adjusted to that value which will just prevent reversal of film stress in X. Then there will be reversal of film stress in Y. Since the resistance of the part of the exciting current path in Y which is not identical with the alternating current path is much higher than the corresponding path in X, we might raise the exciting voltage to a point where there would be no reversal of film stress in Y, but in so doing we should probably be subjecting X to a film stress much higher than is desirable.

From extended study and observation I believe that the corrosion of the leads outside of the eletrolyte is due to conditions similar to those outlined in connection with Fig. 3. The condenser X of this figure may be taken as representing the actual condenser immersed in the main electrolyte and having in multiple with it another condenser Y whose electrolyte is the moisture film and whose electrodes are the leads to the anodes and cathode of the main condenser X. If we operate the main condenser (X) at an exciting voltage of such value as to just prevent reversal of film stress, or even if, in order to take care of various operating contingencies, we operate it at a considerably higher voltage, we may, and undoubtedly do in many cases, have reversal of film stress in the moisture film electrolyte, with resulting corrosion of the leads. We might overcome this corrosion by raising the exciting voltage to such a value as to prevent reversal of film stress in the moisture film electrolyte, but in many cases this would be disadvantageous to the condenser itself. We might increase the exciting voltage impressed on the electrodes in the moisture film electrolyte without increasing that on the electrodes in the main electrolyte by some such scheme as that shown in Fig. 4, where a resistance R' is employed to cut down the value of the exciting voltage before applying it to the main electrodes; or by a scheme involving two sources of exciting voltage. In the former case the resistance would be in the cathode lead between the cathode lead terminal and the cathode proper. It might be just below the cathode insulator and above the condenser electrolyte. Or we might make use of the expedient of Fig. 5 which employs a second cathode immersed in the moisture film electrolyte and not in the main electrolyte and which has a higher exciting voltage impressed upon it either by means of the additional source of exciting voltage shown, or by means of a resistance used in the way indicated in Fig. 4. In this case, the main condenser X' will be excited by means of the cathode K (common to both electrolytes) and the moisture film condenser Y' would be excited by means of the auxiliary cathode K''. There would be a tendency for leakage of unidirectional current between K and K'' through the moisture film between them. The lead to the cathode K might be inside (concentric with and insulated from) the auxiliary cathode K''.

But the preferable method of preventing reversal of film stress in the moisture film is that of insuring that the alternating current leakage paths and the exciting leakage path in this film shall be "identical" or substantially so. Some of the methods of accomplishing this are as follows:

Referring to Fig. 6, A, A, represent a pair of anodes immersed in an electrolyte E and connected to the external alternating current circuit by means of leads L, L, brought out through insulators mounted in the cover C of the vessel or tank (not shown) containing the electrolyte. The insulators are of the inverted cup type. For simplicity it is first assumed that the cover C is of glass or other suitable insulating material. The "moisture film" is indicated by the dotted line P lying over the surface of the insulators and upon the under surface of the cover between the insulators. It is evident that here the moisture film leakage paths of the alternating and exciting currents are far from being "identical", the departure from this condition being due to the moisture film between the anode lead insulators and the cathode insulator, and also, especially, to the film over the cathode insulator. It is evident that this departure from being "identical" will cause a CR drop of exciting voltage in addition to that occurring in the alternating current leakage path, and, if the resistance of the moisture film between the anode insulators and the cathode insulator, and over the surface of the latter, be sufficiently great, this additional drop of exciting voltage may be great enough to permit reversal of film stress and corrosion of the anode leads. That the additional drop may easily be great enough to permit reversal of film stress is evident when we consider that there may be, and often is, a substantially greater amount of moisture film over the surfaces of the anode insulators and the surface of the tank cover between them, than on the surface of the tank cover between them and the cathode insulator and over the surface of the latter. Or if, as is not infrequently the case, salts or other solid material from the electrolyte build up on one or both of the anode leads (without so building up on the cathode lead) until they touch the inside surface of the anode insulator near its lower edge, thus short-circuiting, wholly or in part, the moisture film inside the anode insulator. In such case the anode leads are always corroded under the accumulation of solid or semi-solid material on the lead. One method, effective in many cases, for practically eliminating the condition just explained, and of preventing corrosion, is to put the cathode between the anodes, as in Fig. 7, for example. In this figure, which shows four anodes connected in groups of two with the balance coil or autotransformer B across the groups, the cathode is divided into three, K', K', K', which are arranged between the anodes A. The cathodes are wide, extending to the sides of the tank. At the present time it is the practise to connect the anodes to busbars inside the tank, with one lead extending out from each busbar. In such case it is usually sufficient to employ a single cathode, arranged between the busbar-leads, as shown at K'' in Fig. 7ª, the cathode being narrowed below the surface of the electrolyte as in Fig. 7ᵇ, to permit the busbars P, P', to extend over the anodes. Now any leakage current between the anode leads must pass over the cathode insulators I', and hence the A. C. and exciting current leakage paths will approximate the condition of being "identical" and having the "same resistance" any reversal of film stress may be prevented for the reasons set forth in connection with Fig. 2.

Evidently, the explanation given above for a glass cover will not be invalidated by making the cover of nonfilming metal, as for example iron. In such case the leakage current will pass from the deposit of moisture or salt on the insulator into the metal of the cover, then through the metal to the deposit on the other insulator; or, if the resistance of the metal be high relative to that of the deposit on the metal, some of the leakage current will flow through the metal and some through the deposit thereon.

If the cover is made of aluminum or other filming metal instead of glass, an insulating film will be formed on it where the exciting current leaves the metal of the cover to go into the film or deposit of moisture or salt on the cathode insulator, but where the exciting current leaves the anode insulator and flows into the metal of the cover it will tend to destroy all oxid film, even that produced by the alternating leakage current. This will have the effect of introducing a greater resistance into the exciting current leakage path than into the leakage path of the alternating current, which, as explained above, will tend to give the latter free rein along its leakage path. On the other hand if the cover is excited by connection with the positive pole of the exciting source, after the method described in my copending application Serial No. 410,344, current cannot flow into the metal of the cover from the moisture or salt deposit thereon. Accordingly the behavior of the cover, although made of metal, will in such case be substantially as if it were made of glass or other insulating material and the action will on the whole be as described above in the discussion of the glass cover.

There are various other ways of approximating the desired equality of resistance. One very effective method is to extend the insulators (at least the anode insulators) into the electrolyte, as in Fig. 8, in which the lower end of the anode insulators I'', I'', are immersed in the electrolyte. Clearly, all alternating leakage currents tending to flow into either anode or either anode-lead must pass through portions of the electrolyte (of relatively low resistance) which are also the paths of the unidirectional exciting current tending to flow from the anodes and anode-leads to the cathode. A similar result can be obtained by fitting into or around the insulators of the anode-leads tubes of non-conducting material, which extend down into the electrolyte, as the tube $i$, Fig. 9. In this case the tube should fit closely enough to insure that the deposit of moisture, salt or other material, on the inside of the insulator, will be continuous with or in good contact with the deposit on the outside of the tube.

The method that is in some respects the most practical is illustrated in Fig. 10, and consists in providing at least one of the anode-lead insulators with an electrical connection to the cathode, as for example by means of bands $b$ of cathode metal surrounding the leads inside or outside of the insulators and connected electrically to the cathode as by a wire $w$ of the same metal. Now any leakage between the anode-leads must flow into one or the other of the bands, and hence must take a path which is equally good for the exciting current, the desirable condition above mentioned being thus realized. With only two anode-leads only one band need be used, since the one band will interrupt all leakage current from or to either lead. If there are more than two anode-leads coming out of the tank all the insulators may be banded, but at least all those around leads of the same polarity should be banded.

Still another form of the invention is illustrated in Fig. 11. Here the anode-lead insulators, I, are provided, inside or outside, with tubes K''' of cathode metal extending down into the electrolyte and either connected to a main cathode, or connected directly to the exciting source S thus themselves constituting the cathode. These tubes then combine the advantages of the wide cathode, illustrated in Fig. 7$^a$ and of the bands $b$, $b$, shown in Fig. 10.

Another method is to use a tank and cover composed of non-filming metal, connecting these parts to the negative pole of the exciting source, thus making the parts named the cathode. For various reasons however this method is not desirable, among which reasons may be mentioned the corrosion due to stray alternating currents.

Still another method is to use a tank of filming metal and a cover of non-filming metal insulated therefrom. In this case the cathode would not be insulated from the non-filming metal cover but would form a part thereof. The metal cover then constitutes in effect the metal bands illustrated in Fig. 10, but with the added complication of insulating the cover from the tank and at the same time providing a liquid-tight joint.

It is to be understood that the invention is not limited to the devices herein specifically illustrated and described but can be embodied in other forms without departure from its spirit.

What I claim is—

1. An electrolytic condenser having means for impressing unidirectional current on the condenser anodes, and also having means to prevent reversal of film stress along leakage paths outside of the electrolyte.

2. An electrolytic condenser having means for impressing unidirectional current on the condenser anodes, and also having means to prevent reversal of film stress on the parts of the anode leads which are outside of the electrolyte.

3. An electrolytic condenser having means for impressing unidirectional current on the condenser anodes, in which the moisture film is supplied with exciting current at a voltage sufficiently high to prevent reversal of film stress on the anode leads.

4. An electrolytic condenser having means for impressing unidirectional current on the condenser anodes, in which the alternating current leakage and the exciting current leakage take paths having substantially equal resistance.

5. An electrolytic condenser having means for impressing unidirectional current on the condenser anodes, in which the alternating current leakage and exciting current leakage take substantially the same paths.

6. An electrolytic condenser having means for impressing unidirectional current on the condenser anodes, and also having a wall through which leads extend for connection with an alternating current circuit and a source of unidirectional exciting current, in combination with means associated with said wall for causing alternating current leakage and exciting current leakage to take paths of substantially equal resistance.

7. An electrolytic condenser having means for impressing unidirectional current on the condenser anodes, and also having a wall through which leads extend for connection with an alternating current circuit and a source of unidirectional exciting current, in combination with means associated with said wall for causing alternating current leakage and exciting current leakage to take substantially the same paths.

8. An electrolytic condenser having means for impressing unidirectional current on the condenser anodes, and also having a wall through which leads extend for connection with an alternating current circuit and a source of unidirectional exciting current, in combination with conducting means associated with at least one of the alternating current leads but insulated therefrom and connected with the source of exciting current.

9. An electrolytic condenser having means for impressing unidirectional current on the condenser anodes, and also having a wall through which leads extend for connection with an alternating current circuit and a source of unidirectional exciting current, in combination with tubular insulators surrounding said leads, and conducting means associated with at least one of the insulators and surrounding the lead, and connected to the source of exciting current.

10. An electrolytic condenser having means for impressing unidirectional current on the condenser anodes, and also having a wall through which leads extend for connection with an alternating current circuit and a source of unidirectional exciting current, in combination with tubular insulators surrounding the leads, and a conducting band arranged around at least one of the insulators and connected to the source of exciting current.

In testimony whereof I hereto affix my signature.

RALPH D. MERSHON.